United States Patent [19]

Jung

[11] 4,080,145
[45] Mar. 21, 1978

[54] APPARATUS FOR PROCESSING FOAMED PLASTIC

[75] Inventor: Hubert Jung, Hilchenback, Germany

[73] Assignee: Schloemann-Sieman Aktiengesellschaft, Dusseldorf, Germany

[21] Appl. No.: 728,128

[22] Filed: Sep. 30, 1976

[51] Int. Cl.² .............................................. B29C 1/16
[52] U.S. Cl. ................................. 425/451.5; 425/4 R
[58] Field of Search ............................ 425/451.5, 4 R

[56] References Cited

U.S. PATENT DOCUMENTS

| 1,976,740 | 10/1934 | McChesney | 425/387 X |
| 2,338,280 | 1/1944 | Brundage | 425/451.5 X |
| 3,768,952 | 10/1973 | Connolly | 425/451.5 |

Primary Examiner—Robert L. Spicer, Jr.
Attorney, Agent, or Firm—Norman S. Blodgett; Gerry A. Blodgett

[57] ABSTRACT

Apparatus for molding plastic including two mold halves, one of which is mounted on a bed plate and the other of which is mounted on a mounting plate which is in turn hingedly mounted on the bed plate.

5 Claims, 1 Drawing Figure

U.S. Patent        March 21, 1978        4,080,145
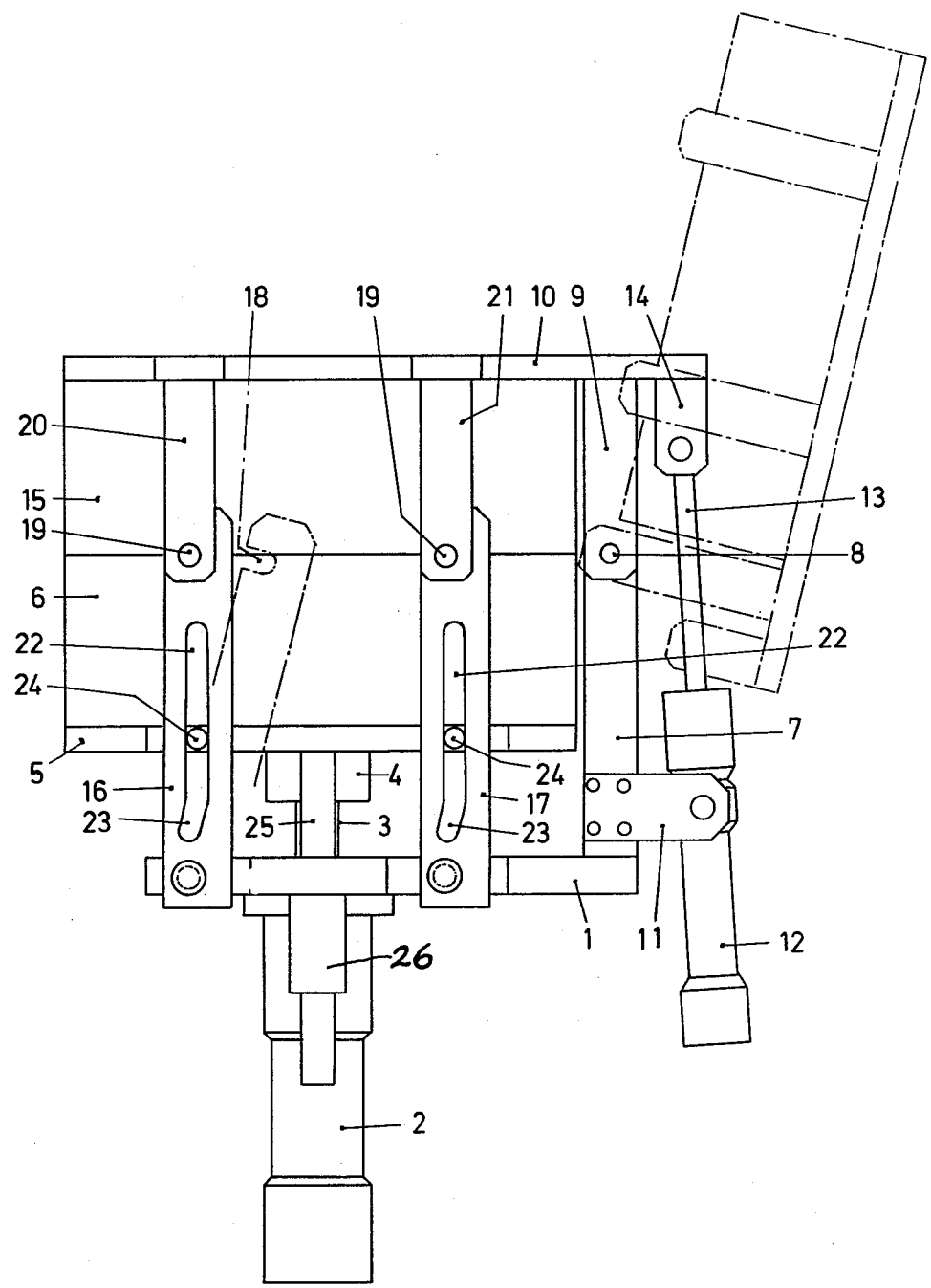

0
APPARATUS FOR PROCESSING FOAMED PLASTIC

BACKGROUND OF THE INVENTION

In the processing of foamed plastics in a two-part mold, the closed mold cavity is partly filled by means of an injection molding unit, connectable to the mold, with a predetermined amount of plastic, the remaining space being occupied by the foaming of the plastic. The air in the mold cavity escapes along with the gases freed during the foaming process through the parting line of the mold.

To be able to carry out the opening and closing movements of the two-part mold to remove the molded article, it is old to arrange one mold half stationarily on a bed plate. Into this bed plate are set two guide columns which are outside of the mold half, which extend a distance beyond the total mold height, and which are interconnected at their free ends by a tie-bar. Below the tie-bar is held a closing plate that is movable and the guide columns and that carries at its surface facing toward the bed plate the other mold half. To the tie-bar is affixed a hydraulically-actuatable piston-cylinder unit, whose piston rod engages the closing plate. By means of this piston-cylinder unit the mold can be opened and closed, so that the one mold half is lifted from the other mold half, while maintaining its parallel position. If required, special interlocking contrivances may be provided at the mold halves for creating the closing force as described in the German patent application DT-AS 21 17 534.

On such a known device the movable mold half must be raised a relatively large distance from the stationary mold half to allow a satisfactory removal from the mold. This necessitates relatively long guide columns which makes such a device rather expensive. Such a device is, therefore, not economically usable for small molded articles.

For the fabrication of small moldings, such as shoe soles, out of foamed plastic a device is known in which one mold half is fixed to a stationary bed plate in a similar manner. At the bed plate is further articulated a hinged mounting plate that takes up the second mold half at its surface facing toward the bed plate. Because of this hinged mold half, the mold is easily accessible, especially for removal of the finished molded article and nevertheless has a low overall height. It is also possible here to interlock the two mold halves in closed condition by means of special contrivances. This know device has, it is true, a simple, economically-acceptable construction, but it has the drawback that it is not possible to move the two mold halves apart in parallel. Therefore, only moldings that have in the direction of the hinged mold half a level area of contact lying in the range of the parting line of the mold can be fabricated in this device.

It is, therefore, an outstanding object of the invention to provide apparatus for the processing of foamed plastic in such a way that, with the simplest and the least expensive construction, it is possible to obtain, first, a parallel opening of the two mold halves and, subsequently, a raising of one mold half on hinges.

SUMMARY OF THE INVENTION

In general, the invention consists of apparatus for the processing of foamed plastics by means of a two-part mold adjoining an injection molding unit, one mold half being braced against a bed plate, while the other mold half is mounted on a hinged mounting plate which in turn is articulatedly connected to the bed plate, characterized by the fact that a closing plate 5 carries a mold half 6 that is guided at the bed plate 1 and adjustable relative to it, and at least two levers 16, 17 are located at opposite sides of the bed plate 1, the levers being tiltable by a connecting link guide 22, 24 and interlocable with the mounting plate 10.

The design of the device in accordance with the invention permits the closing plate with the lower mold half to be lowered parallel from the upper mold half which is affixed to the mounting plate. In the last part of this lowering movement, levers are tilted through the connecting link guide, so that the bed plate is locked during the molding process with the mounting plate together with the upper mold half can be swung out on hinges through a separate drive. When the mold is being closed, these motions take place in reverse order.

BRIEF DESCRIPTION OF THE DRAWINGS

The character of the invention, however, may be best understood by reference to one of its structural forms, as illustrated by the accompanying drawings, in which:

Additional features and advantages of the invention are explained hereunder in detail with the aid of an exemplified embodiment shown in the drawing.

DESCRIPTION OF THE PREFERRED EMBODIMENT

The drawing shows a bed plate 1 of an apparatus for the processing of foamed plastic that carries bolted to at its underside a hydraulically-actuatable piston-cylinder unit 2. The piston rod 3 of the piston-cylinder unit 2 projects throught an opening of the bed plate 1 and is threaded with its free end into a pressure plate 4. This pressure plate 4 is firmly connected to a closing plate 5 that is arranged in parallel with the bed plate 1 and which can be moved by the piston-cylinder unit 2 to and from the bed plate 1. The closing plate 5 receives an exchangeable mold half 6 the surface that faces away from the bed plate 1.

To the bed plate 1 is laterally affixed a support 7 that receives an axle 8 near to its free end.

On this axle 8 is tiltingly supported a lever 9 which in the area of the axle 8 is constructed in a forked shape. The lever 9 forms part of a mounting plate 10 which occupies the position (shown in the drawing in solid lines) parallel to the bed plate 1 and thus to the closing plate 5. At the support 7 is affixed an arm 11 that tiltingly takes up a likewise a hydraulically-actuatable piston-cylinder unit 12. The piston rod 13 of the piston-cylinder unit 12 is suspended in a forked pin 14 that is connected to the mounting plate 10. The arrangement of the lever 9 and the forked pin 14 at the mounting plate 10 is so selected that the mounting plate can be swiveled by the piston-cylinder unit 12 from the position shown in the drawing in solid lines into the brake-like position. At the surface that faces the closing plate 5, the mounting plate 10 receives the other mold half 15.

In the example shown in the drawing there are tiltingly supported at the lateral surface of bed plate 1 (located in front in the drawing) two levers 16 and 17 arranged at a distance from each other and equidistant from the piston-cylinder unit 2. Also, the opposite side of the bed plate 1 carries two similar levers which are, however, hidden by the levers 16, 17. The levers 16, 17 are of identical design and each has at its free end a transverse recess 18, which (in the position of the levers 16, 17 shown in the drawing in solid lines) interacts with a pivot 19. These pivots 19 are in the nature of forked ends arranged at arms 20, 21 which on their part are laterally connected to the mounting plate 10. By means of the levers 16, 17 with the recesses 18, and the arms 20, 21 with pivots 19, the mounting plate 10 can be interlocked in the position shown with the bed plate 1.

Each lever 16, 17 is formed with an elongated hole 22 which (in the illustrated interlocking position of levers 16, 17) extends along the major part of its length perpendicular to the tool mounting table of the closing plate 5. Adjacent the bed plate 1, each elongated hole 22 has a slightly canted region 23. At its side face, located in the range of the levers 16, 17 the closing plate 5 carries two pins 24 each of which extends into an elongated hole 22 of a lever 16, 17.

By means of their interaction with the elongated holes 22, the pins 24 assure that the two levers 16, 17 are held in the closed position shown in solid lines, so that the mounting plate 10 is interlocked during the process of injection with the bed plate 1. The closing force for the two mold halves, 6, 15 is furnished by the piston-cylinder unit 2. As soon as the injecting and molding process has been completed and the molded article which has been formed in the mold halves 6, 15 has hardened sufficiently, then the piston-cylinder unit 2 is acted on by pressure oil in such a way that the closing plate 5 with the mold half 6 are moved toward the bed plate 1 remaining parallel thereto. During the first part of this movement, the levers 16, 17 remain in the position shown in solid lines. As soon as the pins 24 arrive in the oblique portions of the elongated holes 22, the levers 16, 17 are tilted clockwise into the position (shown in the broken lines) and the interlock is thereby released. As soon as the closing plate 5 reaches the opened, end position, the pressure rise now appearing in the pressure oil line leading to the piston-cylinder unit 2 operates through a corresponding control link to admit pressure oil to the piston-cylinder unit 12, so that now the mounting plate 10 with the mold 15 is turned upwardly. The molded article formed in the mold 6, 15 can now be removed without any difficulty.

Subsequently, the piston-cylinder unit 12 is acted on by pressure oil in reverse order and in that way the mounting plate 10 with the mold half 15 is again tilted into the position shown in the drawing in solid lines. As soon as this position has been reached, the pressure rises in the pressure oil line leading to the piston-cylinder unit 12. This pressure rise operates through a corresponding control link to cause an actuation of the piston-cylinder unit 2 by pressure oil. By means of this piston-cylinder unit 2 the closing plate 5 with the mold half 6 is not moved again into the closed position. During the operation of this closing movement, the levers 16, 17 are tilted by means of the pins 24 sliding in the elongated holes 22 from their broken-line position to the solid line position, and the bed plate 1 is thereby locked to the mounting plate 10.

To be able accurately to guide the closing plate 5 during the opening and closing movement, there are arranged on this embodiment at the underside of the closing plate 5 two guide rods 25 that are affixed at an interval to two opposite sides of pressure plate 4. For taking up these guide rods 25 there are inserted into the bed plate 1, bushings 26. The bed plate 1 is advantageously pivoted on a bracket, not shown, which in turn is tiltable around a horizontal axis. In this way it is possible to tilt the two mold halves 6, 15, depending on the contour of the article to be molded, into such a spatial position that a satisfactory venting of the mold cavity tapes place constantly across the parting line of mold 6, 15.

It is also possible to control the successive cutting in of the two piston-cylinder units 2, 12 by means of special limit switches.

I claim:

1. Apparatus for the injection molding of foamed plastic, making use of a two-part mold, comprising:
   a. a bed plate (1), having an upper surface,
   b. a closing plate (5) for carrying a first mold part, the closing plate being slidably connected to the bed plate, such that said closing plate is movable along an axis which is normal to the upper surface of said bed plate,
   c. a mounting plate (10) for carrying a second mold part, the mounting plate being hingedly connected to the bed plate, such that in a first hinged position the second mold part, as attached to the mounting plate, lies in a face-to-face, parallel relationship to the first mold half, as attached to the closing plate, and is in such an orientation that a sliding movement of the closing plate away from the bed plate brings the two mold halves into contact, and in a second hinged position the second mold part, as attached to the mounting plate, lies in a substantially perpendicular relationship to the first mold part, as attached to the closing plate,
   d. an elongated locking lever attached to the bed plate and rotatable about a plane perpendicular to the upper surface of said bed plate, having near its free end a first engagement means, and having a suitable length such that, when said mounting plate is in its first hinged position, the rotation of said lever into a substantially vertical orientation relative to the bed plate upper surface causes the engagement of said first engagement means with a second and complimentary engagement means which second engagement means is fixedly attached to the mounting plate, and
   e. a means for rotating the elongated locking lever which employs movement of the closing plate with respect to the bed plate as an integral part of its operation comprising a slot in the lever substantially coaxial to the lever except for a cant in the slot end nearest the bed plate, a guide fixedly attached to the closing plate, which guide lies slidably in the slot, such that, when the closing plate is adjacent the bed plate, the guide lies in the canted portion of the slot, causing the lever to stand at a substantial angle to the normal axis of the bed plate upper surface, and, particularly, causing the first and second engagement means to be in a disengaged position, and said guide, when the closing plate is in a position substantially spaced from the bed plate, lying in the coaxial portion of the lever slot causing the lever to be in a vertical position, and particularly causing the first and second engagement means to be engaged.

2. Apparatus as recited in claim 1, wherein between the bed plate (1) and the closing plate (5) is arranged a hydraulically-actuable piston-cylinder unit (2).

3. Apparatus as recited in claim 1, wherein at the underside of the closing plate are mounted guide rods (25) which are received by guide bushings (26) in the bed plate (1).

4. Apparatus as recited in claim 1, wherein at the mounting plate (10) and a point some distance from the hinge axis, is attached an end of a hydraulically-actuable piston-cylinder unit (2), which piston-cylinder unit's other end is attached to the bed plate, and whose purpose is to actuate the hinged motion of the mounting plate.

5. Apparatus as recited in claim 1, wherein the bed plate (1) is pivoted on a bracket that is tiltable about a horizontal axis.

* * * * *